Patented Oct. 11, 1927.

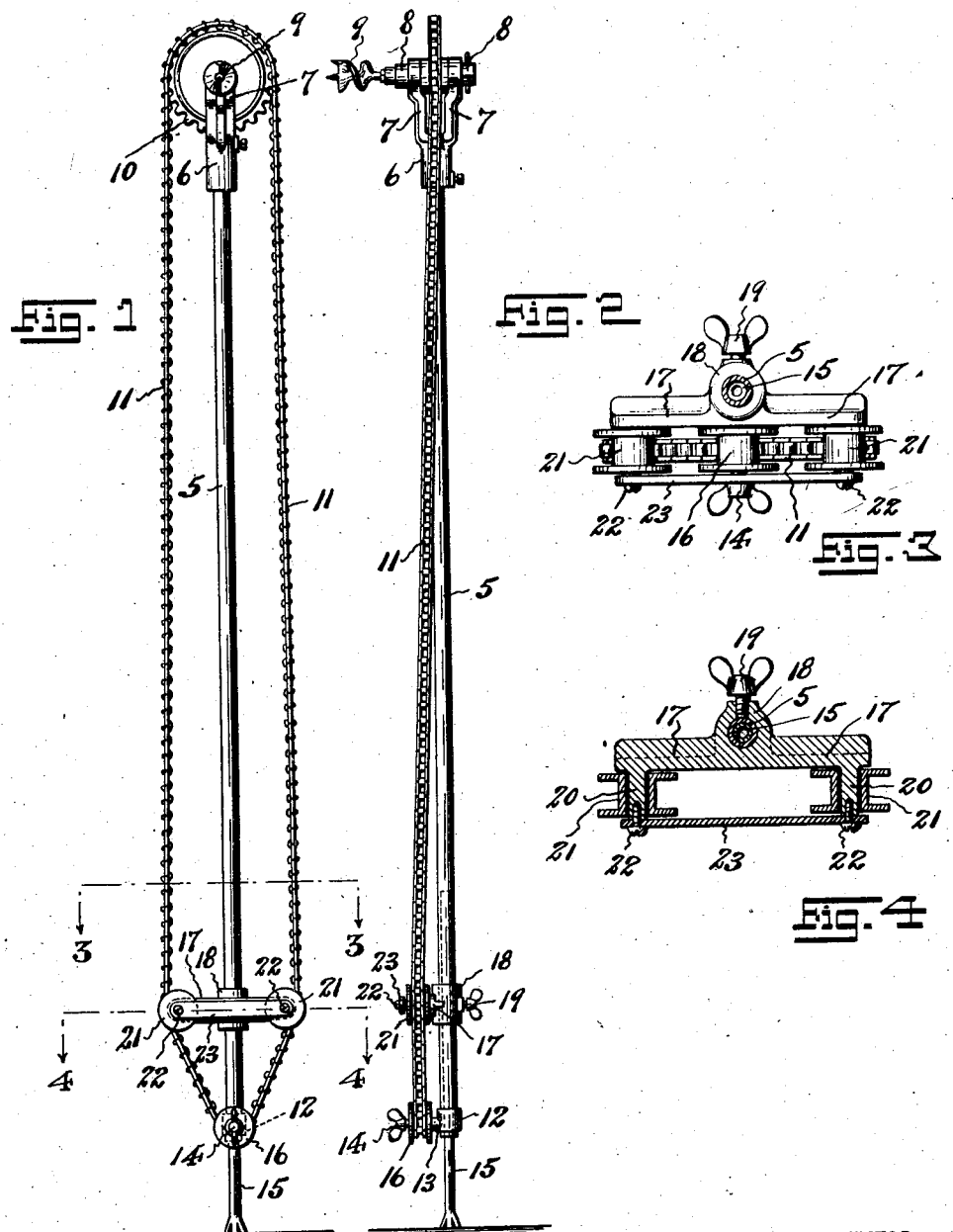

1,644,831

UNITED STATES PATENT OFFICE.

ROBERT HALSEY HENDERSON, OF EAST ORANGE, NEW JERSEY.

OVERHEAD-BORING MACHINE.

Application filed September 16, 1925. Serial No. 56,610.

This invention relates, generally, to improvements in over-head joist boring machines; and the invention has reference, more particularly, to a novel chain driven boring machine adapted especially for heavy work involved in boring holes of relatively large diameters, e. g. from two inches upward.

This invention has for its principal object to provide a novel construction of heavy duty boring machine, comprising a vertical rigid support provided with a chain driven rotatable head at its upper end having a chuck for mounting large size boring bits or augers, together with a simple and effective means, adjustable on the rigid support, for both guiding and regulating the tension of the drive chain, whereby the operator is enabled to most efficiently apply power to the rotary head with a minimum of effort, and, furthermore, whereby the ascending and descending runs of the chain are so spread apart or separated that the operator's hands, when engaging one run of the chain, are guarded against injurious contact with either the support or the opposite run of said chain.

Other objects of this invention, not at this time more particularly enumerated, will be clearly understood from the following detailed description of the same.

The invention is clearly illustrated in the accompanying drawings, in which:—

Figure 1 is a front elevation of the novel heavy duty joist boring machine, made according to and embodying the principles of this invention; Figure 2 is a side elevation of the same; Figure 3 is a transverse horizontal section, on an enlarged scale, taken on line 3—3 in Figure 1; and Figure 4 is a detail transverse horizontal section, also on an enlarged scale, taken on line 4—4 in Figure 1.

Similar characters of reference are employed in all of the hereinabove described views, to indicate corresponding parts.

Referring now to said drawings, the reference character 5 indicates a rigid vertical support in the form of an upright column or standard, preferably of tubular form. Secured to the upper end of this support 5 is a bifurcated head 6 adapted to provide a pair of spaced bearing arms 7, in and between which is journaled a rotatable chuck member 8. Said chuck member 8 is adapted to receive, hold and rotate a boring bit or auger tool 9 which extends outwardly from one end thereof. Fixed on said chuck member 8, so as to be disposed between the spaced bearing arms 7, is a drive sprocket 10, which is retained against undue lateral play by the engagement of its hub between said bearing arms 7. Running over said drive sprocket 10 is an endless link belt or drive chain 11.

Fixed on the lower extremity of said upright support 5 is a ferrule 12 having a laterally projecting boss 13. Said boss 13 is tapped and internally threaded through the ferrule 12 and wall of the support 5 to receive a set-screw 14. Telescopically fitted for slidable adjustment in the lower end of said upright support is an extensible foot-piece or leg 15. Said set-screw 14 serves a two-fold purpose; first, to engage and lock said foot-piece or leg 15 in desired extended position, to thus determine the desired height of the support relative to the location at which the hole is to be bored; and, second, to serve as a journal for rotatably supporting a flanged idler guide-pulley 16 upon which the lower end of said endless link belt or drive chain 11 may run.

The novel means for both properly spreading the ascending and descending runs of said endless belt or drive chain 11, while at the same time determining the proper tension at which said belt or chain shall run, comprises a transverse or lateral spreader bar 17 provided at its rear side and intermediate its ends with an integrally formed sleeve 18 which is slidable on said upright support 5 adjacent to the lower end of the latter. Threaded through the back of said sleeve 18 is a set-screw 19, adapted to engage the support 5 to lock said spreader bar 17 in desired adjusted position thereon. Said spreader bar 17 is provided, adjacent its respective free ends, with forwardly projecting journal studs 20. Journaled for free rotation on said journal studs 20 are flanged spreader pulleys 21, which respectively engage the opposite runs or courses of said belt or chain 11 as the same runs over and between the sprocket 10 and idler guide pulley 16. Connected to and between the ends of said journal studs 20, by fastening screws 22 or other suitable fastening means, is a keeper bar 23 for retaining the spreader pulleys 21 against displacement from said journal studs.

As will be understood from an inspection of the drawings, and from the above description of the parts making up my novel overhead joist boring machine, the drive belt or chain is manipulated by the operator to produce a rotary movement of the drive sprocket 10, which is in turn transmitted to the chuck member 8 and the boring bit or auger 9 carried thereby. The support 5, through a proper setting of the extensible foot piece or leg 15 connected with its lower end, having been erected to present the boring bit or auger 9 at the location in which the desired hole is to be bored, the operator may thereupon grasp the rigid support 5 by one hand so as to steady the same in working position, while his other hand is employed to pull on the belt or chain 11. The steady and efficient application of power to the rotary chuck member and boring bit with a minimum of effort, particularly when boring holes of relatively large diameter, requires that the drive belt or chain 11 be neither too tight nor too slack; for if the chain runs too tight, not only is undue wear on both chain and rotatable chuck of likely occurrence, but also frictional resistance absorbs power which should be expended in driving the boring bit; on the other hand, if the chain runs too loose, not only is the smooth and even transmission of power interfered with, and possible jumping of the chain relative to the drive sprocket likely, but the slack chain is very likely to permit the operator's hand to come in contact with either the support 5 or the oppositely running course of the chain with probable consequent injury. It is therefore desirable that provision should be made to enable both proper adjustment of the running tension of the chain, as well as provision adapted to maintain properly spread apart or separated the respective oppositely running courses of the chain both from each other and respectively from the support or standard 5.

In the present invention both of the above mentioned desirable provisions are furnished by a single simple and effective means, comprised in the spreader bar 17 which is adjustably secured to the rigid support or standard 5. The rotatable spreader pulleys 21, with which said spreader bar 17 is equipped, in respectively engaging the opposite runs or courses of the drive chain, as the same extend between the sprocket 10 and lower fixed idler guide pulley 16, serve to spread and hold apart the said oppositely running courses of the chain, as well as to space the same outwardly or away from the rigid support or standard 5. By vertically adjusting the fixed position of said spreader bar 17 on the support or standard 5, nearer to or further away from the idler guide pulley 16, as the case may be required, the running tension of the chain may be nicely determined for most efficient operation, so that the power may be transmitted to the chuck and boring bit with a minimum of effort, and so as to avoid undue wear and strains on the running parts.

From the above description it will be evident that my present invention provides a very efficient overhead boring machine which is strong, durable, simply constructed and easily actuated, and which is especially adapted for heavy duty work such as is involved in manipulating boring bits of relatively large sizes or diameters.

Having thus described my invention, I claim:—

In an overhead boring machine, a vertical standard having at its upper end means to support a rotatable boring bit chuck provided with a driving sprocket and at its lower end means to support an idler guide pulley, an idler guide pulley on said supporting means, said idler guide pulley being of substantially smaller diameter than said driving sprocket, an endless drive chain running over and between said sprocket and guide pulley, a transverse spreader bar provided with spreader pulleys at its opposite ends to engage the oppositely running courses of said chain, said spreader bar having a hub intermediate its ends vertically adjustable on said standard, and means to lock said hub against movement to thus position said spreader bar relative to said guide pulley so as to determine the desired running tension of said chain between the latter and said sprocket while at the same time holding the courses of said chain outwardly spaced from said standard.

In testimony that I claim the invention set forth above I have hereunto set my hand this 12th day of September, 1925.

ROBERT HALSEY HENDERSON.